(12) United States Patent
Pratt

(10) Patent No.: US 6,337,145 B1
(45) Date of Patent: Jan. 8, 2002

(54) MULTILAYER MATERIAL FOR SLIDING ELEMENTS AND PROCESS FOR THE PRODUCTION THEREOF

(75) Inventor: George Pratt, Isle of Harris (GB)

(73) Assignee: Federal-Mogul Wiesbaden GmbH & Co., Wiesbaden (DE)

(*) Notice: Subject to any disclaimer, the term of this patent is extended or adjusted under 35 U.S.C. 154(b) by 0 days.

(21) Appl. No.: 09/559,930

(22) Filed: Apr. 27, 2000

(30) Foreign Application Priority Data

Apr. 28, 1999 (EP) .............................. 99108300

(51) Int. Cl.⁷ .................... B32B 15/00; C25D 5/50
(52) U.S. Cl. ............ 428/645; 148/706; 148/902; 148/906; 205/225; 205/227; 205/252; 205/254; 384/912; 420/570; 420/573; 428/935
(58) Field of Search .................. 428/645, 935; 384/912; 420/570, 573; 148/902, 906, 706; 205/225, 227, 252, 254

(56) References Cited

U.S. PATENT DOCUMENTS 4,622,205 A * 11/1986 Fouts et al. ............... 420/570
5,666,644 A    9/1997 Tanaka et al. ............. 428/553
5,976,712 A * 11/1999 Staschko et al. ........... 428/645

FOREIGN PATENT DOCUMENTS

| DE | 195 45 427 | 7/1996 |
| JP | 062 800 90 | 4/1994 |

* cited by examiner

Primary Examiner—Robert R. Koehler
(74) Attorney, Agent, or Firm—Herbert Dubno

(57) ABSTRACT

A process for the production of sliding elements in which an overlay of lead-tin-copper is applied by electroplating to the prefabricated semi-finished product, and in which a ternary, fluoroborate-free electroplating bath is used without brighteners and with the addition of non-ionic wetting agents and free alkyl sulfonic acid. After the deposition of the galvanic overlay a heat treatment is carried out in the temperature range of 150° C. to 200° C. for between 1 and 100 hours. The multilayer material for sliding elements comprises at least a backing and an overlay of 12 to 16 wt. % tin and 7 to 11 wt. % copper, the rest being lead. The overlay comprises 15 to 25 wt. % particles of intermetallic compound Cu6Sn5.

14 Claims, 2 Drawing Sheets

MULTILAYER MATERIAL FOR SLIDING ELEMENTS AND PROCESS FOR THE PRODUCTION THEREOF

FIELD OF THE INVENTION

My present invention relates to a process for the production of sliding elements such as bearings, seals, antifriction elements and the like. The invention also relates to a multilayer material for such applications.

BACKGROUND OF THE INVENTION

Sliding elements should be understood to include all types of bearing liners as well, inter alia, as pistons and piston rings. Overlays of multilayer materials for sliding elements are generally produced by electroplating in appropriate electrolyte baths. There have hitherto generally been used for this purpose fluoroborate-containing baths, which have a number of disadvantages.

Deposits from fluoroboric acid-based baths are unstable at the temperature at which crankshaft bearings operate in internal combustion engines. The main alloying element in the lead-based overlay, which may be tin or indium, diffuses at engine temperature into the underlying copper-lead lining, resulting in a loss of tin or indium from the overlay and a corresponding reduction in the resistance of the overlay to wear, fatigue cracking and corrosion. Diffusion into the copper-lead lining may be prevented by the incorporation of an electro-deposited nickel "dam" between the copper-lead lining and the overlay, but diffusion towards the nickel still occurs, resulting in the growth of a nickel-tin compound such as NiSn on the surface of the nickel dam. A degree of loss of the alloying element from the overlay thus occurs in spite of the presence of the overlay results. However, the extent of the deterioration is not as great when a nickel dam is present as when it is not, and for that reason a nickel dam is generally incorporated in overlay-plated copper-lead crankshaft bearings.

The significant discovery disclosed in DE 195 45 427 A1 is that lead-based overlays may be deposited from an alkyl-sulfonic bath which show the delirious diffusion behavior described above to a much lesser extent than overlays from a fluoroboric acid bath. The reduction in diffusion is such that the nickel dam may be omitted, resulting in a simplification of the plating process, while at the same time an improvement in the bearing performance of the overlay is obtained. In particular the resistance of the overlay to corrosion is improved, and the wear incurred during engine operation is reduced. The experimental results demonstrating these advantages have been described in "New Bath Formulation for Electrodeposition of Improved Corrosion and Wear-Resistant Sliding Layers for Engine Bearings" by Grünthaler, Hun, Muiller, Staschko and Toth, SAE Paper 960964, Feb. 26–29, 1996.

Although hardness was improved by 20% compared to conventional sliding layers, wear resistance was not yet satisfactory.

OBJECTS OF THE INVENTION

It is therefore an object of the invention to so improve the process known from DE 195 45 427 as to further increase the wear resistance of the sliding layer.

It is also an object of the invention to create an improved layer compound material.

Still another object is to provide a method of making an improved bearing material, especially for crankshaft and like bearings, whereby the drawbacks of earlier systems are obviated.

SUMMARY OF THE INVENTION

The object is achieved by a process whereby, after application of the galvanic running layer, a heat treatment is performed in the temperature range 150° C. to 200° C. for a period of 1–100 h.

It has been found that the heat treatment results in diffusion and coming together of the copper and tin components, so that particles of the intermetallic phase $Cu_6Sn_5$ are generated. Due to these $Cu_6Sn_5$ particles the wear of the sliding layer is reduced by approximately 50%.

The heat treatment is preferably executed in air.

According to a further embodiment, the heat treatment may also be executed in oil, whereby paraffin oil and silicone oil are particularly suitable.

The heat treatment is preferably performed in a temperature range between 170° and 185° C.

The heat treatment is preferably performed for a period of 4–12 h.

The process known from DE 195 45 427 is especially well suited to generate both tin and copper in high concentrations. It was found that the content of $Cu_6Sn_5$ particles is greater, the higher the tin and copper contents are. To further improve wear-resistance, the running layer of 12–16 weight-% tin and 7–11 weight-% copper and remainder lead is preferably applied.

The layer material for sliding members shows 15–25 weight-% $Cu_6Sn_5$ particles in the sliding layer.

The lead-bronze layer and a nickel layer are preferably provided between the sliding layer and the support layer.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
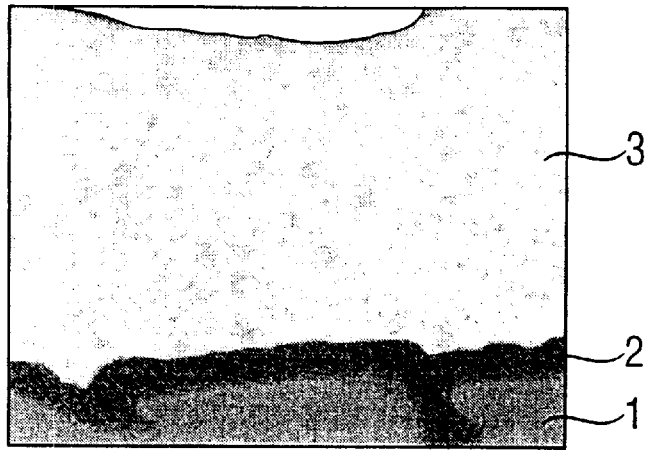
FIG. 1a is a microphotograph of a microsection of the layer material produced according to DE 195 45 427 A1.
Figure 1B:
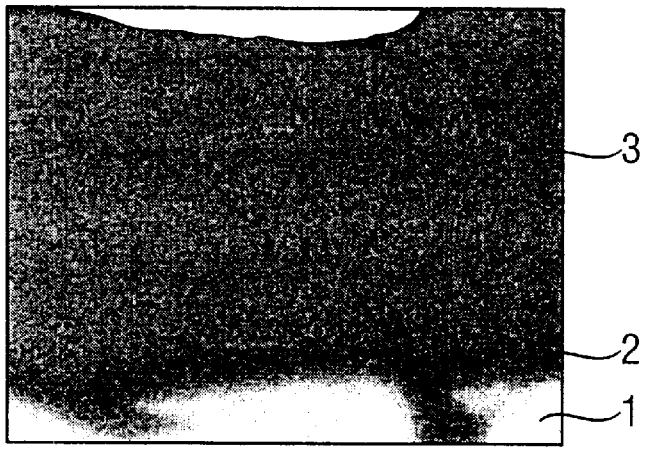
FIGS. 1b and 1c are detail views of the sliding layer with accentuation of copper and tin proportions.
Figure 1C:
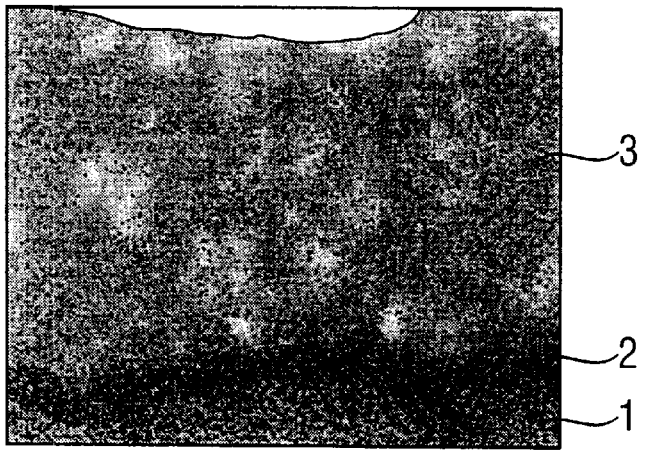
Figure 2A:
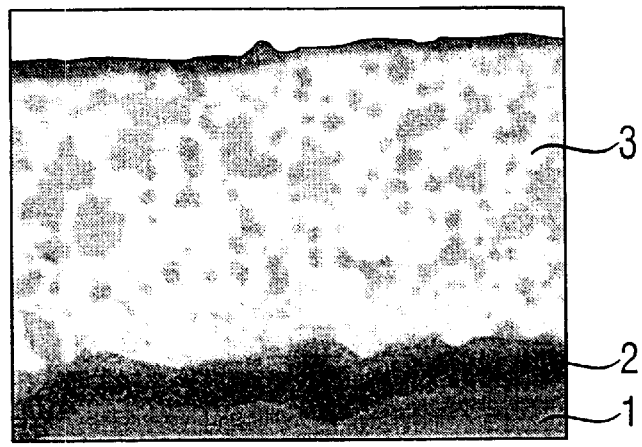
FIGS. 2a–2c are views similar to FIGS. 1a–1c of the material after 8 hours heat treatment at 177° C.
Figure 2B:
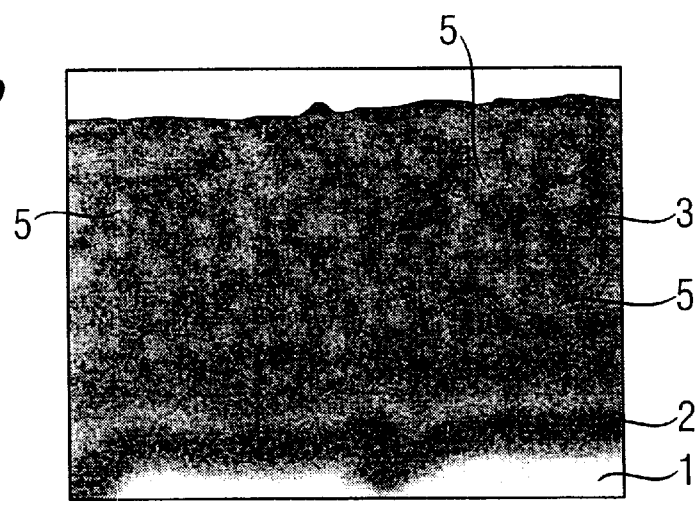
Figure 2C:
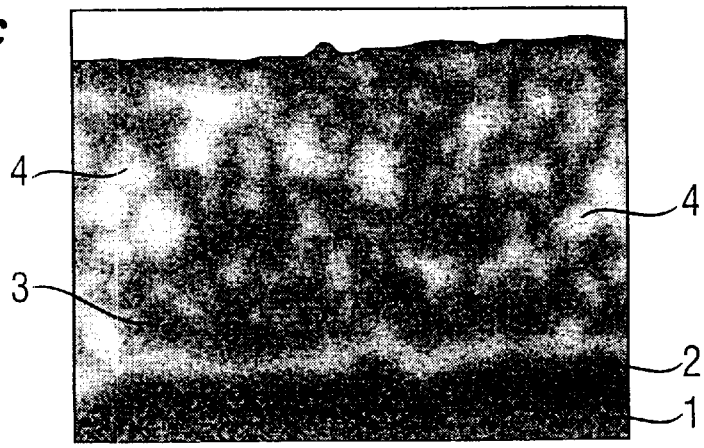

FIG. 1a shows a microsection of a sample prior to heat treatment. A lead-bronze layer 1 and a nickel layer 2 as well as a sliding layer 3 are applied on a carrier material (not shown) by the process according to DE 195 45 427 A1, whereby the sliding layer consists of 7.8 weight-% Cu, 15.5 weight-% Sn and remainder copper. FIGS. 1b and 1c show enlargements of the sliding layer 3, whereby the distribution of the individual components copper and tin are respectively shown in elemental maps obtained on an electron microscope. FIG. 1b shows no copper particles at all, whereas FIG. 1c shows significant tin accumulations. After heat treatment for 8 hours at 177° C. the structure in sliding layer 3 has changed (FIG. 2a). The tin accumulations or tin particles 4 have increased (FIG. 2c) and there are now additional copper particles 5 which are visible in FIG. 2b. The presence of coincident concentrations of copper and tin shows that particles consisting of the intermetallic phase $Cu_6Sn_5$ must be present.

The appearance of intermetallic particles in the overlay, harder than the surrounding matrix, would be expected to increase wear resistance and this has been demonstrated during engine tests.

The table shows the results of comparison of heat-treated and non-heat-treated bearings plated according to DE 195 45 427 after being run in a Caterpillar 3126 heavy-duty engine. Overlay composition was 7.8% copper, 15.5% tin and remainder lead, and the heat treatment was at 177° C. for 8 hours.

|  | Heat-treated Bearings | Non-heat treated Bearings |
|---|---|---|
| Overlay thickness micron | 23 | 23 |
| Test hours | 75 | 75 |
| Average overlay wear micron | 5.9 | 13.2 |
| Average weight loss mg | 68.2 | 100.5 |

The wear suffered by the heat-treated bearings was 45% of that suffered by the non-heat-treated bearings.

I claim:

1. In a process for the production of sliding elements in which a sliding surface is formed, the improvement which comprises the steps of:
   (a) electroplating on said surface an overlay of lead-tin-copper from a ternary fluoroborate-free electroplating bath without brighteners and with addition of a non-ionic wetting agent and free alkyl sulfonic acid; and
   (b) heat treating said galvanic overlay in a temperature range of 150° C. to 200° C. for a period between 1 and 100 hours.

2. The process defined in claim 1 wherein the heat treatment is carried out in air.

3. The process defined in claim 1 wherein the heat treatment is carried out in oil.

4. The process defined in claim 3 wherein the heat treatment is carried out in paraffin oil or silicone oil.

5. The process defined in claim 1 wherein the heat treatment is carried out at a temperature between 170° C. and 185° C.

6. The process defined in claim 1 wherein the heat treatment is carried out for a period between 4 and 12 hours.

7. The process defined in claim 1 wherein said galvanic overlay is electrodeposited in a composition of 12 to 16 wt. % tin, 7 to 11 wt. % copper and balance lead.

8. The process defined in claim 7 wherein the heat treatment is carried out in air.

9. The process defined in claim 7 wherein the heat treatment is carried out in oil.

10. The process defined in claim 9 wherein the heat treatment is carried out in paraffin oil or silicone oil.

11. The process defined in claim 10 wherein the heat treatment is carried out at a temperature between 170° C. and 185° C.

12. The process defined in claim 11 wherein the heat treatment is carried out for a period between 4 and 12 hours.

13. A sliding element having a sliding surface and an overlay on said surface consisting essentially of 12 to 16 wt. % tin, 7 to 11 wt. % copper and balance lead, comprised in an amount of 15 to 25% by weight of said overlay of intermetallic particles of the compound $Cu_6Sn_5$.

14. An overlay for a bearing surface consisting essentially of 12 to 16 wt. % tin, 7 to 11 wt. % copper and balance lead and wherein 15 to 25% by weight of said overlay consists of particles of the intermetallic compound $Cu_6Sn_5$.

* * * * *